(12) United States Patent
Kwon et al.

(10) Patent No.: US 7,515,571 B2
(45) Date of Patent: Apr. 7, 2009

(54) FRAME STRUCTURE FOR BRIDGING OPERATION IN HIGH-SPEED WIRELESS PERSONAL AREA NETWORK AND DATA TRANSMITTING METHOD THEREOF

(75) Inventors: Seo-Won Kwon, Seoul (KR); Se-Youn Lim, Seoul (KR); Jin-Hee Kim, Suwon-si (KR); Jae-Yeon Song, Seoul (KR); Yoon-Sun Lee, Seoul (KR); Jong-Hwa Lee, Suwon-si (KR)

(73) Assignee: Samsung Electronics, Co., Ltd., Suwon-Si, Gyeonggi-Do (KR)

( * ) Notice: Subject to any disclaimer, the term of this patent is extended or adjusted under 35 U.S.C. 154(b) by 537 days.

(21) Appl. No.: 10/891,614

(22) Filed: Jul. 15, 2004

(65) Prior Publication Data

US 2005/0113102 A1 May 26, 2005

(30) Foreign Application Priority Data

Nov. 24, 2003 (KR) .................... 10-2003-0083782

(51) Int. Cl.
*H04Q 7/24* (2006.01)
(52) U.S. Cl. ...................... 370/338; 370/401
(58) Field of Classification Search ............. 455/435.2, 455/434, 422.1, 454, 41.1–41.3; 370/338, 370/401
See application file for complete search history.

(56) References Cited

U.S. PATENT DOCUMENTS

2003/0152110 A1* 8/2003 Rune .......................... 370/509

2004/0136338 A1* 7/2004 Lin et al. ..................... 370/329
2004/0218683 A1* 11/2004 Batra et al. .................. 375/261

FOREIGN PATENT DOCUMENTS

| JP | 2003-124944 | 4/2003 |
|---|---|---|
| WO | WO 01/41348 | 6/2001 |
| WO | WO 03/047176 | 6/2003 |
| WO | WO03047176 A1 * | 6/2003 |

* cited by examiner

*Primary Examiner*—Alexander Eisen
*Assistant Examiner*—Wayne Cai
(74) *Attorney, Agent, or Firm*—Cha & Reiter, LLC

(57) ABSTRACT

Disclosed is a frame structure in a high-speed wireless personal area network (WPAN) and a message transmitting method thereof which enable communications among devices existing in different piconets by using a device that provides a bridging function in the IEEE 802.15.3 WPAN. In a high-speed WPAN system which includes a parent piconet having a plurality of devices and a child piconet using time slots allocated by the devices located in the parent piconet, and a bridge device located in the child piconet, that broadcasts information about the devices of the parent piconet and information about the devices of the child piconet to the devices included in the high-speed WPAN, and operates to perform a data transfer between a first specified device in the child piconet and a second specified device in the parent piconet. A specified device included in the high-speed WPAN constructs a MAC (Media Access Control) header data structure for a data transmission so that the data structure includes a source piconet identification (ID) field for indicating the piconet to which the specified device belongs, and a destination piconet ID field for indicating the destination piconet to which the destination device, to which the specified device intends to transmit data, belongs.

4 Claims, 8 Drawing Sheets

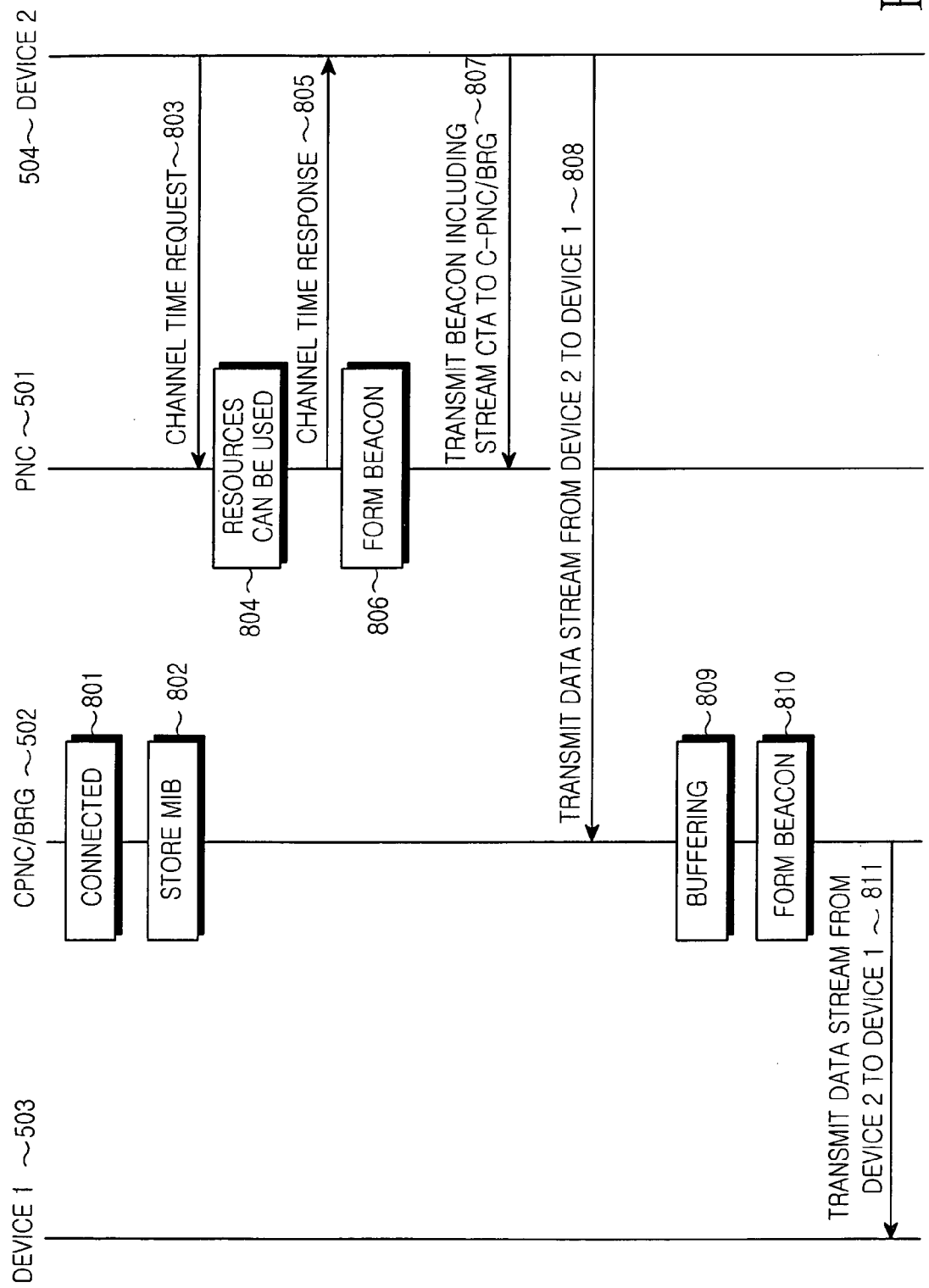

FRAME STRUCTURE FOR BRIDGING OPERATION IN HIGH-SPEED WIRELESS PERSONAL AREA NETWORK AND DATA TRANSMITTING METHOD THEREOF

CLAIM OF PRIORITY

This application claims priority, pursuant to 35 USC §119, to that patent application entitled "New Frame Structure For Bridging Operation In High-Speed Wireless Personal Area Network And Data Transmitting Method Thereof" filed in the Korean Intellectual Property Office on Nov. 24, 2003 and assigned Serial No. 2003-83782, the contents of which are hereby incorporated by reference.

BACKGROUND OF THE INVENTION

1. Field of the Invention

The present invention relates to an IEEE 802.15.3 high-speed wireless personal area network (WPAN) using an ultra-wide band (UWB), and more particularly to a high-speed WPAN which can support communications among devices included in different piconets in the high-speed WPAN.

2. Description of the Related Art

A wireless communication technique using UWB is a technique that guarantees a transmission distance in the range of 10 m to 1 km. The UWB wireless communication technique had been used as a military wireless communication technique by the US Department of Defense for the past 40 years, and has been open to the nonmilitary sector by the Federal Communications Commission (FCC), which is the US authority on communication frequencies.

The UWB wireless communication technique is a ultra-high-speed wireless data transmitting technique using a bandwidth of several GHz, for high transmitting speed (of 500 Mbps to 1 Gbps) with a low power consumption (1/100 of the power consumption of a mobile phone or a wireless LAN) in comparison to other existing transmission techniques, such as IEEE 802.11, Bluetooth, etc. The UWB wireless communication technique can be used in diverse fields such as a short-distance personal communication network that connects a computer, peripheral devices and home appliances to an ultra-high-speed wireless interface in a short distance (up to 100 m), a radar for examining, by fluoroscopy, the interior of a building, a high-precision position measurement, a device for preventing a car collision, an underground mine detector, a system for preventing the loss of an article, or a detection of an object inside a body, etc.

A standard for the UWB wireless communication technique has been proposed as a high-speed wireless personal area network (WPAN) in IEEE 802.15.3. In the IEEE 802 standards groups, IEEE 802.15.1 is a group that establishes the Bluetooth standards, and IEEE 802.11 is a group that establishes the wireless LAN standards.

Bluetooth has been commercialized as a widely known personal area network (PAN), and has recently been applied to many network-related products. Bluetooth generally uses a frequency band of 2.4 GHz (i.e., ISM band), and provides a personal area network (PAN) solution with its communication distance limited to less than 10 m. The wireless LAN of the IEEE 802.11 group that takes charge of the wireless LAN standard has already been standardized.

IEEE 802.15.3 has be divided into three task groups; TG1 (Task Group 1), TG2 and TG3. TG1 establishes the Bluetooth standards, and TG2 performs technical analysis of methods for enabling Bluetooth products and existing wireless LAN business to coexist. TG3 researches the standard of a high data rate PAN solution, and is now conducting research in a transmission system having transmission speeds of more than 55 Mbps.

FIG. 1 illustrates an exemplary piconet designated among communication devices in an IEEE 802.15.3 high-speed wireless PAN. As shown the piconet that forms the high-speed wireless PAN is composed of a plurality of communication devices 10, 12, 14, 16 and 18. One device 10 among them operates as a piconet coordinator (PNC). Here, the PNC serves as a master of the corresponding piconet and performs synchronization with the respective devices, manages time slots for data communication, and performs other control operations.

PNC device 10 manages the time slots required for the communications among the devices located in the piconet by using a message referred to as a beacon in order to perform synchronization with the connected devices 12, 14, 16 and 18. PNC 10 additionally serves to control a QoS (Quality of Signal), a power save mode, and piconet access.

As described above, the IEEE 802.15.3 device 10, serving as the piconet coordinator, can designate the piconet. The device having a capability as the piconet coordinator forms the piconet by searching
channels in order to start the piconet, selecting one of the channels that is not in use, and broadcasts a beacon frame through the selected channel. The devices 12, 14, 16 and 18 that have received the broadcast beacon frame set the channel for their communications in response to the received beacon frame. In this case, the PNC device 10 allocates and provides IDs for the respective devices 12, 14, 16 and 18 that have responded to the beacon.

In another aspect, a device may take part in the piconet already formed, through an association procedure. That is, the device, which has moved from the outside onto the already formed piconet A, requests connection with a device in the piconet A . Accordingly, PNC device 10 provides a single device ID to the device that has requested the connection., which can be used in the piconet A.

Through the above-described process, the piconet as shown in FIG. 1 is formed. Here, the respective devices 12, 14, 16 and 18, except for the PNC device 10, request PNC device 10 for data transmission. The PNC device 10 allocates communicable time slots to the respective devices 12, 14, 16 and 18 in response to the data transmission request. When the PNC device 10 allocates the time slots to the respective devices 12, 14, 16 and 18, it uses the beacon frame. The respective devices 12, 14, 16 and 18 perform the data transmission in a time corresponding to the time slot allocated by the PNC device 10.

When a device desires to terminate the communication in the piconet or to perform a disconnection, a piconet disassociation procedure is performed between the PNC device 10 and the corresponding device. In this case, the PNC device 10 deletes information about the recorded device through the piconet disassociation procedure.

The piconet designated between the PNC device 10 and the respective devices 12, 14, 16 and 18 may be divided into an independent piconet which can independently allocate the time slots to the devices existing in the piconet, and a dependent piconet which distributes and allocates the time slots provided from a PNC device located outside the piconet to the devices existing in the piconet. If a dependent piconet is newly produced in a independent piconet, the independent piconet at that time is referred to as a parent piconet, and the newly produced dependent piconet is referred to as a child piconet or a neighbor piconet. In this case, the independent piconet becomes the parent piconet, and the dependent piconet becomes the child piconet. In this case, the child piconet (i.e., dependent piconet) shares and uses the channel provided from the PNC device of the parent piconet.

FIG. 2 is a view illustrating an example of a dependent piconet designated in the IEEE 802.15.3 high-speed wireless PAN network.

According to FIG. 2, the existing piconet is a parent piconet 30, and a PNC device of the parent piconet 30 is referred to as P-PNC device 32. A device having a capability of being a PNC device, except for the P-PNC device 32, among the devices 22, 32 and 42, which constitute the parent piconet 30, can be defined as child piconet 20 (C-PNC).

P-PNC device 32c, located in the parent piconet 30, allocates time slots to the C-PNC device 22 and another device 34, which define the child piconet, and transmits the beacon frame. Here, the C-PNC device 22 is a device that performs a PNC function in the child piconet 20.

C-PNC device 22 may also define the child piconet 20, and separately manage and control the device 24 that is included in child piconet 20. The communication in the child piconet 20 can be performed only between the devices 22 and 24 that define the child piconet 20.

Accordingly, the C-PNC device 22 is a member that is included in the parent piconet 30 and manages and controls the child piconet 20. Thus, the C-PNC device 22 can perform a communication with the devices 32 and 34 in the parent piconet 30.

However, in the conventional IEEE 802.15.3 high-speed wireless PAN using the ultra-wide band (UWB), it is impossible to perform a communication between the device 34 in the parent piconet 30 and the device 24 in the child piconet 24. This results in inefficient communication between devices of different networks. Hence, there is a need in the industry for a method and system for communicating between devices of different networks

SUMMARY OF THE INVENTION

Accordingly, the present invention has been made to solve the above-mentioned problems occurring in the prior art, and an object of the present invention is to provide a frame structure in a high-speed wireless personal area network (WPAN) and a message transmitting method thereof that enables communications among devices existing in different piconets by using a device that provides a bridging function in the IEEE 802.15.3 WPAN.

In order to accomplish this object, there is provided a new data structure for a bridging operation in a high-speed wireless personal area network (WPAN) system which includes a parent piconet and having a plurality of devices and a newly defined child piconet using time slots allocated by the devices located in the parent piconet, the system having a bridge device which is located in the child piconet, that broadcasts information about the devices of the parent piconet and information about the devices of the child piconet to the devices included in the high-speed WPAN, and operates to perform a data transfer between a first specified device included in the child piconet and a second specified device included in the parent piconet, wherein a specified device included in the high-speed WPAN constructs a MAC. (Media Access Control) header data structure for a data transmission so that the data structure includes a source piconet identification (ID) field for indicating the piconet to which the specified device belongs, and a destination piconet identification (ID) field for indicating the destination piconet to which the destination device, to which the specified device intends to transmit data, belongs.

In another aspect of the present invention, there is provided a data transmitting method in a high-speed wireless personal area network (WPAN) which includes a parent piconet designated in advance and having a plurality of devices, a newly designated child piconet using time slots allocated by the devices located in the parent piconet, and a bridge device which is located in the child piconet, broadcasts information about the devices of the parent piconet and information about the devices of the child piconet to the devices included in the high-speed WPAN so that the respective devices store complete device information, and operates to perform a data transfer between a first specified device included in the child piconet and a second specified device included in the parent piconet, the data transmitting method comprising a first step of the first specified device being allocated with a first channel time for a data transmission from a first piconet coordinator that is a piconet coordinator of the child piconet, and transmitting data to the first piconet coordinator at the first channel time, a second step of the first piconet coordinator buffering the transmitted data, and a third step of the first piconet coordinator being allocated with a second channel time for a data transmission from a second piconet coordinator that is a piconet coordinator of the parent piconet, and transmitting the data to the second specified device at the second channel time.

In still another aspect of the present invention, there is provided a data transmitting method in a high-speed wireless personal area network (WPAN) which includes a parent piconet designated in advance and having a plurality of devices, a newly designated child piconet using time slots allocated by the devices located in the parent piconet, and a bridge device which is located in the child piconet, broadcasts information about the devices of the parent piconet and information about the devices of the child piconet to the devices included in the high-speed WPAN so that the respective devices store device information, and operates to perform a data transfer between a first specified device included in the child piconet and a second specified device included in the parent piconet, the data transmitting method comprising a first step of the second specified device being allocated with a first channel time for a data transmission from a first piconet coordinator, which is a piconet coordinator of the parent piconet, and transmitting data to a second piconet coordinator, which is a piconet coordinator of the child piconet at the first channel time, a second step of the second piconet coordinator buffering the transmitted data, and a third step of the second piconet coordinator allocating a second channel time for the data transmission, and transmitting the data to the second specified device at the second channel time.

BRIEF DESCRIPTION OF THE DRAWINGS

The above and other objects, features and advantages of the present invention will be more apparent from the following detailed description taken in conjunction with the accompanying drawings, in which:

FIG. 8 is a flowchart illustrating data communications among devices that belong to different piconets according to another embodiment of the present invention.

DETAILED DESCRIPTION OF THE INVENTION

Figure 1:
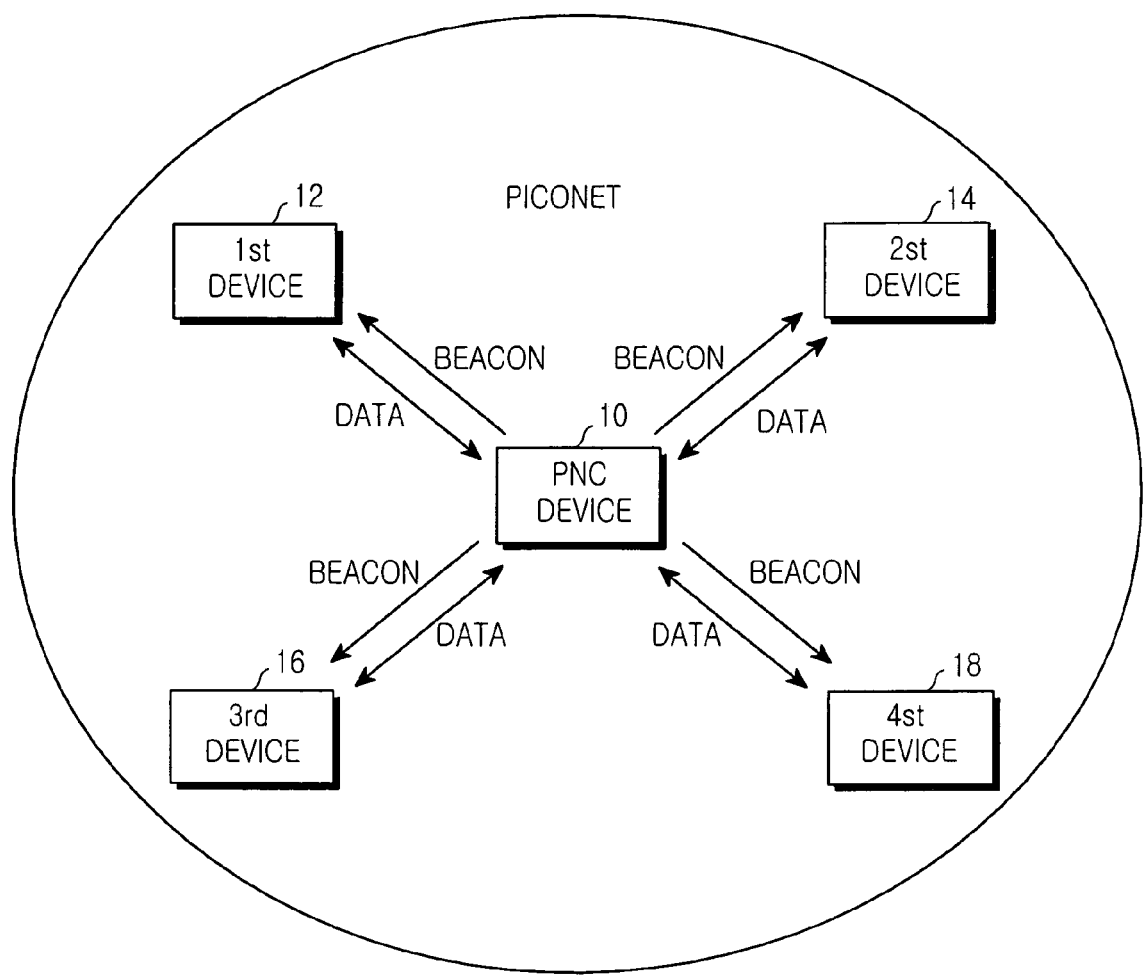
FIG. 1 is a view illustrating an example of a piconet designated among devices in an IEEE 802.15.3 high-speed wireless personal area network.
Figure 2:
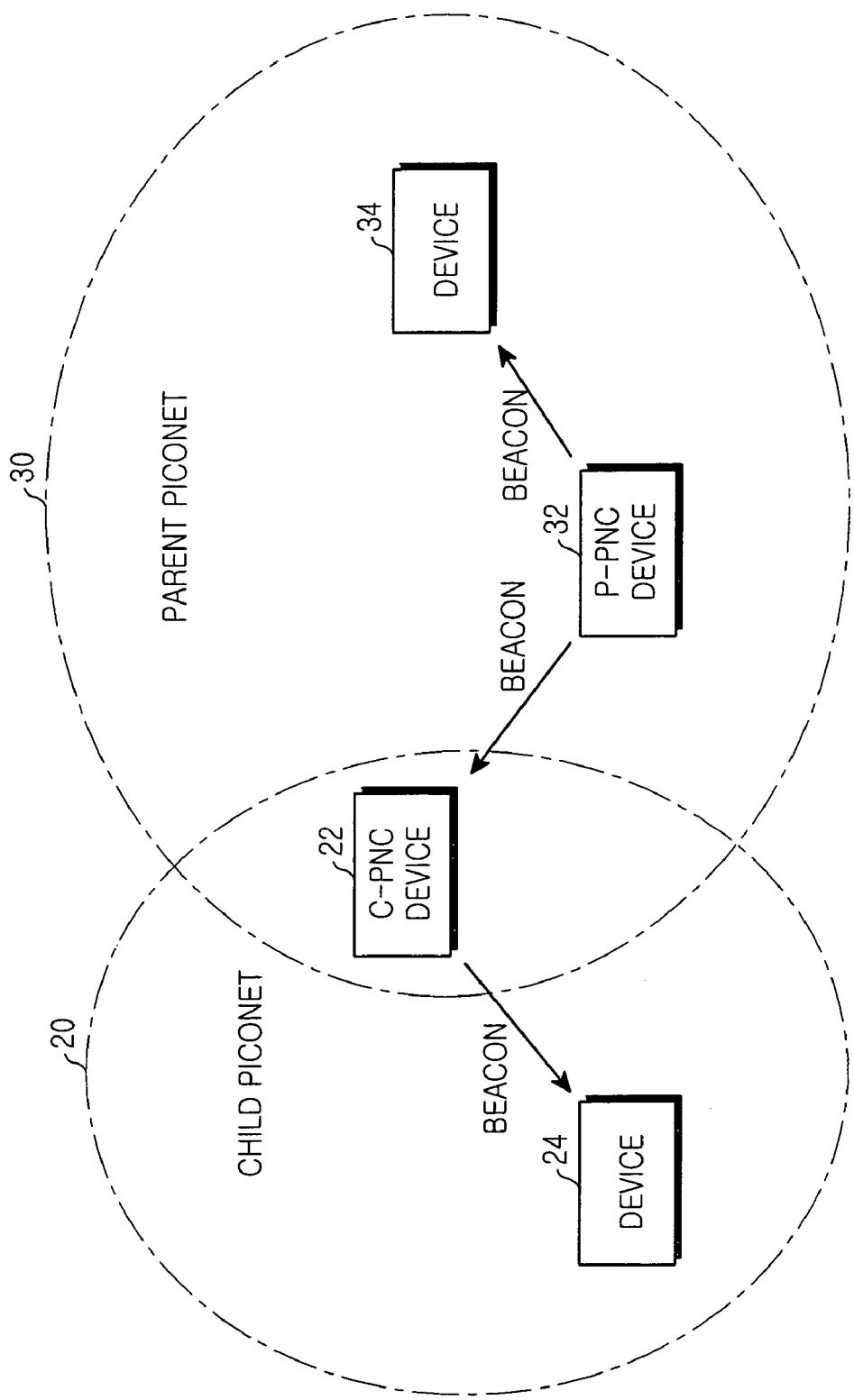
FIG. 2 is a view illustrating an example of a dependent piconet designated in an IEEE 802.15.3 high-speed wireless personal area network.

Hereinafter, a frame structure in a high-speed wireless personal area network (WPAN) and a message transmitting method thereof according to embodiments of the present invention are described with reference to the accompanying drawings. In the following description of the present invention, same drawing reference numerals are used for the same elements even in different drawings. Also, a detailed description of known functions and configurations incorporated herein will be omitted when it may make the subject matter of the present invention rather unclear.

Figure 3:
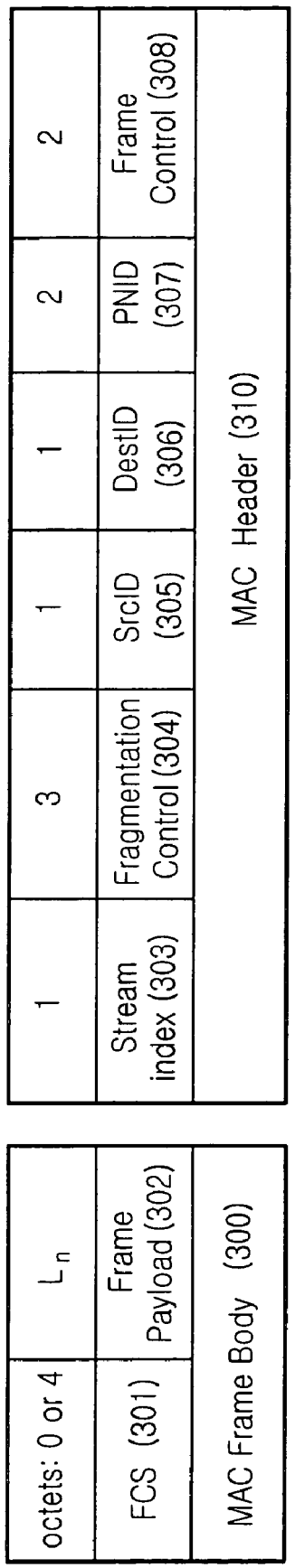
FIG. 3 is a view illustrating a message structure in a general IEEE 802.15.3 high-speed wireless personal area network.

FIG. 3 is a view illustrating a message structure in a general IEEE 802.15.3 high-speed wireless personal area network. As shown, the message in the general IEEE 802.15.3 high-speed wireless personal area network (WPAN) is composed of a MAC frame body 300 and a MAC header 310. The MAC frame body 300 is composed of a FSC 301 for an error control and a frame payload 302 that includes data to be transmitted.

The MAC header 310 includes a stream index field 303, composed of one byte, for discriminating a message, a fragmentation control field 304, composed of three bytes, for a fragmentation control, an SrcID field 305, composed of one byte, for displaying a source device, a DestID field 306, composed of one byte, for displaying a destination device, a PNID field 307, composed of two bytes, for displaying a piconet in which devices are located, and a frame control field 308, composed of two bytes, for a frame control.

Although the source device (e.g., SrcID field) and the destination device (e.g., DestID field) may be divided from each other, communications between devices are basically performed only in one piconet since there is only one PNID field 307.

Figure 4:
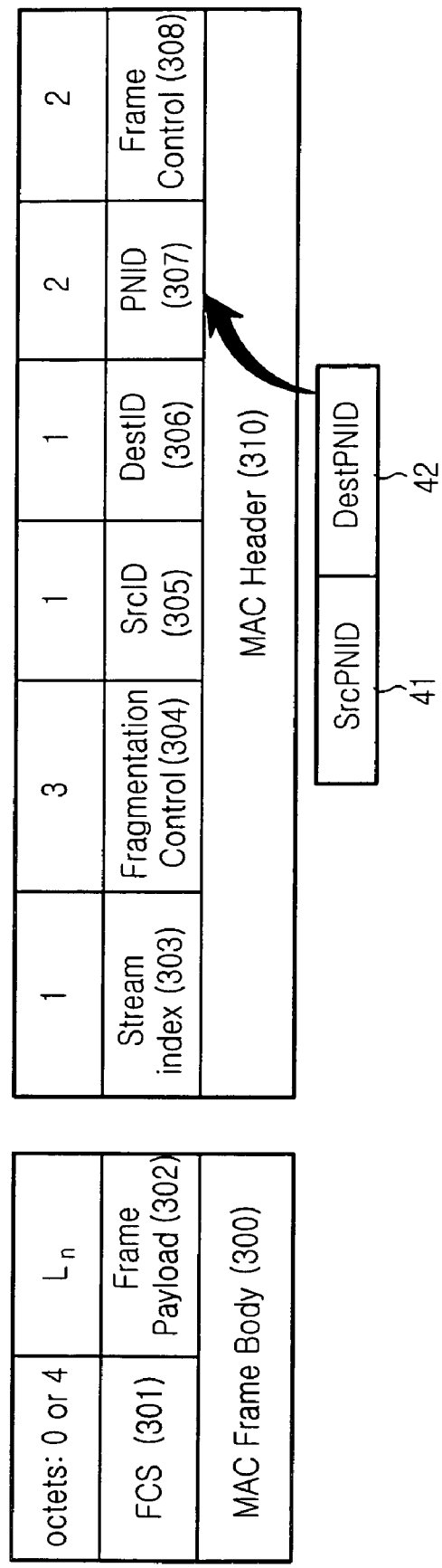
FIG. 4 is a view illustrating a frame structure for communications between piconets in an IEEE 802.15.3 high-speed wireless personal area network according to the present invention.

FIG. 4 is a view illustrating a frame structure for communications between piconets in an IEEE 802.15.3 high-speed wireless personal area network according to the present invention.

As shown in FIG. 4, the frame structure has the same structure as the conventional frame structure as illustrated in FIG. 3, however, a two-byte PNID field 307 is included wherein one-byte designates a source device and one-byte designates a destination device. Further, by indicating the positions of the respective piconets even if the source device and the destination device are located in different piconets, it become possible to perform communications between devices that belong to different piconets.

Undoubtedly, it is impossible to perform the communications only by discriminating between the source piconet and the destination piconet. That is, in order to perform the communications between the source piconet and the destination piconet, an intermediate construction between them is required. Such a construction is illustrated in FIG. 5.

Figure 5:
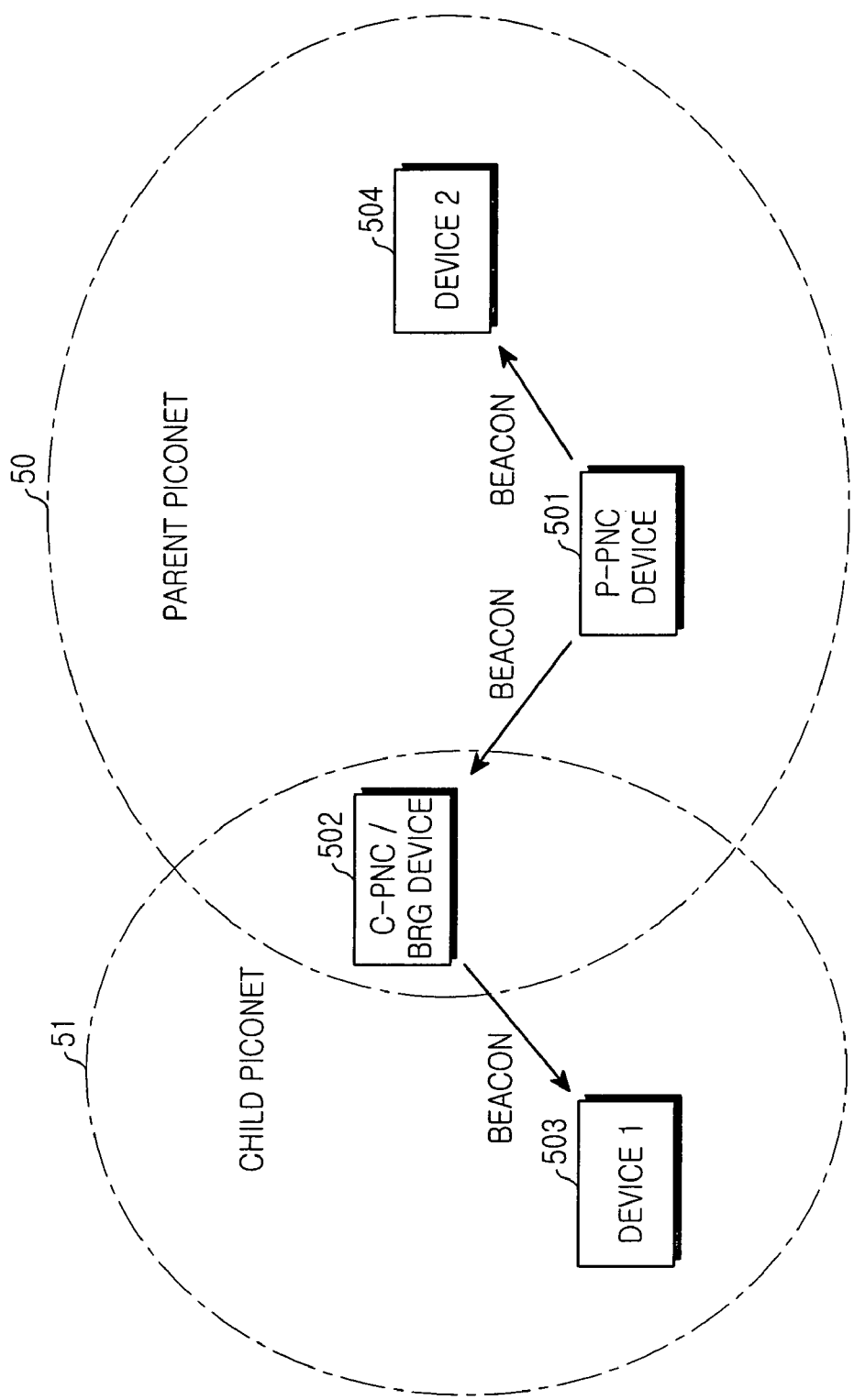
FIG. 5 is a view illustrating an IEEE 802.15.3 high-speed wireless personal area network enabling communications between different piconets according to an embodiment of the present invention.

FIG. 5 is a view illustrating an IEEE 802.15.3 high-speed wireless personal area network enabling communications between different piconets according to an embodiment of the present invention.

As shown in FIG. 5, the IEEE 802.15.3 high-speed wireless personal area network (WPAN) according to the present invention is composed of a parent piconet 50 and a child piconet 51. The parent piconet 50 includes a P-PNC device 501, a device 2 504, and a C-PNC/BRG device 502 of the child piconet. The child piconet 51 includes the C-PNC/BRG device 502 and a device 1 503.

Here, the C-PNC/BRG device 502 serves to perform a control operation so as to perform communications between the piconets. That is, the C-PNC/BRG device 502 provides the communications between a source device and a destination device using respective PNID values in the case that a source PNID and a destination PNID are separately provided as shown in FIG 4. The operation of the C-PNC/BRG device 502 according to the different source PNID and destination PNID will be explained later with reference to FIG. 6.

In the construction of FIG. 5, the C-PNC/BRG device 502 additionally serves as a bridge in addition to the functions related to a conventional C-PNC device. That is, the C-PNC/BRG device may not only serve as a piconet coordinator of the child piconet but also a bridge between the piconets. In the embodiment of the present invention shown, one device performs functions of both the child piconet coordinator and the bridge. However, the C-PNC device and the bridge may be separated from each other, and another of the devices in the child piconet may perform the function of the bridge.

The operation of the bridge according to the present invention will now be explained.

First, the IEEE 802.15.3 high-speed WPAN is constructed in a manner that a plurality of devices that support the IEEE 802.15.3 high-speed WPAN are connected together, i.e., located in a predetermined area, and one of the devices operates as the piconet coordinator (PNC).

The P-PNC device 501 generates mapping information composed of MAC (Media Access Control) addresses of 64 bits and device IDs of 8 bits using information transmitted from the devices 502 and 504 in the parent piconet, and stores and manages the mapping information in a P-MIB (Parent Piconet Management Information Base). Also, the P-PNC device 501 broadcasts information about the devices 502 and 504 registered in the parent piconet 50 using a beacon frame.

Only the devices 502 and 504 registered in the parent piconet 50 can receive the beacon frame broadcast by the P-PNC device 501. The respective devices 502 and 504 in the parent piconet 50 generate mapping information about the devices 502 and 504 using information of the beacon frame transmitted from the P-PNC device 501, store and manage the mapping information in MIBs for the respective devices.

C-PNC/BRG device 502 that manages and controls the child piconet 51 broadcasts information about the device 1 503 that exists in the child piconet 51, which is not registered as mapping information of a C-MIB (Child Piconet Management Information Base), using the beacon frame. Here, only the device 503 that is registered as the child piconet 51 in the C-PNC/BRG device 502 can receive the beacon frame.

Also, the device 1 503 stores and manages the mapping information about the devices registered in C-MIB of the C-PNC/BRG device 502 in C-MIBs for the respective devices using the beacon frame information broadcast from the C-PNC/BRG device 502.

As described above, in the conventional high-speed wireless PAN, there is no way to share the information about the devices between the parent piconet and the child piconet.

However, according to the present invention, it is possible to share the information about the devices between the parent piconet and the child piconet by the bridging operation.

Specifically, the device having the bridging function broadcasts the information about the devices which are located in the different piconets to the devices which exist in other piconets. Here, the information about the devices which exist in the different piconets is called bridging information. If the respective devices receive the information about the devices which exist in the different piconets, they generate B-MIB (Bridging Management Information Base) about the devices of all the piconets which are connected through the received information about the devices of the different piconets.

Meanwhile, the device having the bridging function switches or transfers the data transmitted from the devices located in the different piconets.

If the bridging operation is performed as described above, there is no exchange of information between the respective piconets although the conventional device ID is allocated, and thus overlapping of the device IDs by piconets can be prevented.

Figure 6:
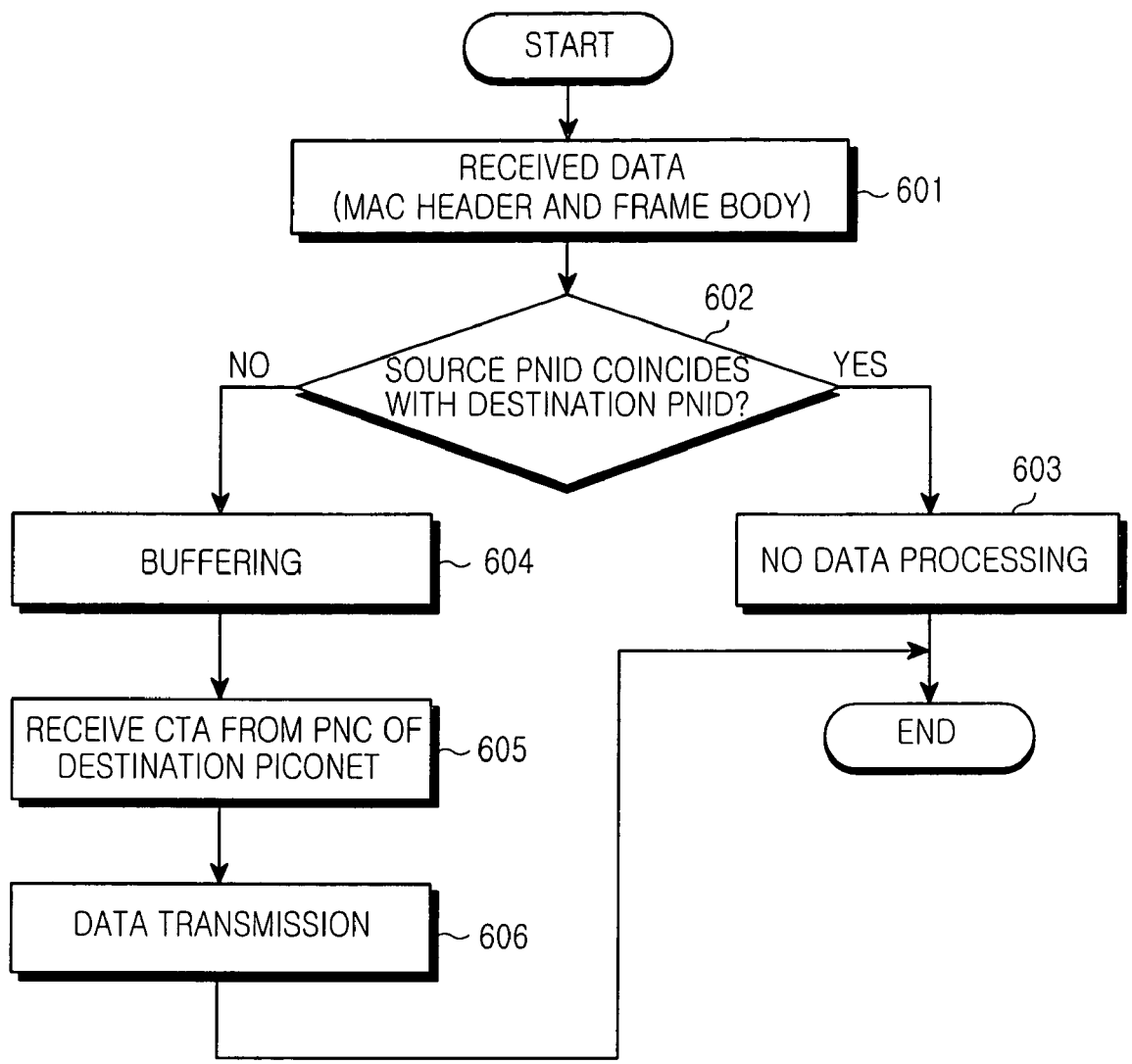
FIG. 6 is a flowchart illustrating a switching operation of a bridge according to PNID information according to an embodiment of the present invention.

FIG. 6 is a flowchart illustrating the switching operation of a bridge according to PNID information according to an embodiment of the present invention. As shown in FIG. 6, if the bridge device according to the present invention receives data which includes a MAC header and a frame body (step 601), it confirms whether a source PNID included in the MAC header coincides with a destination PNID (step 602).

If it is confirmed that the source PNID coincides with the destination PNID at step 602, the bridge device does not perform the data process through the bridge, but performs communications according to the data processing method in the piconet through the PNC of the corresponding piconet.

However, if it is confirmed that the source PNID does not coincide with the destination PNID at step 602, the bridge device performs a buffering of the transferred data (step 604), and waits for reception of a CTA (Channel Time Allocation) from the PNC of the piconet to which the data is to be transmitted (step 605). If the CTA is received from the piconet, the bridge device transmits the data (step 606).

Figure 7:
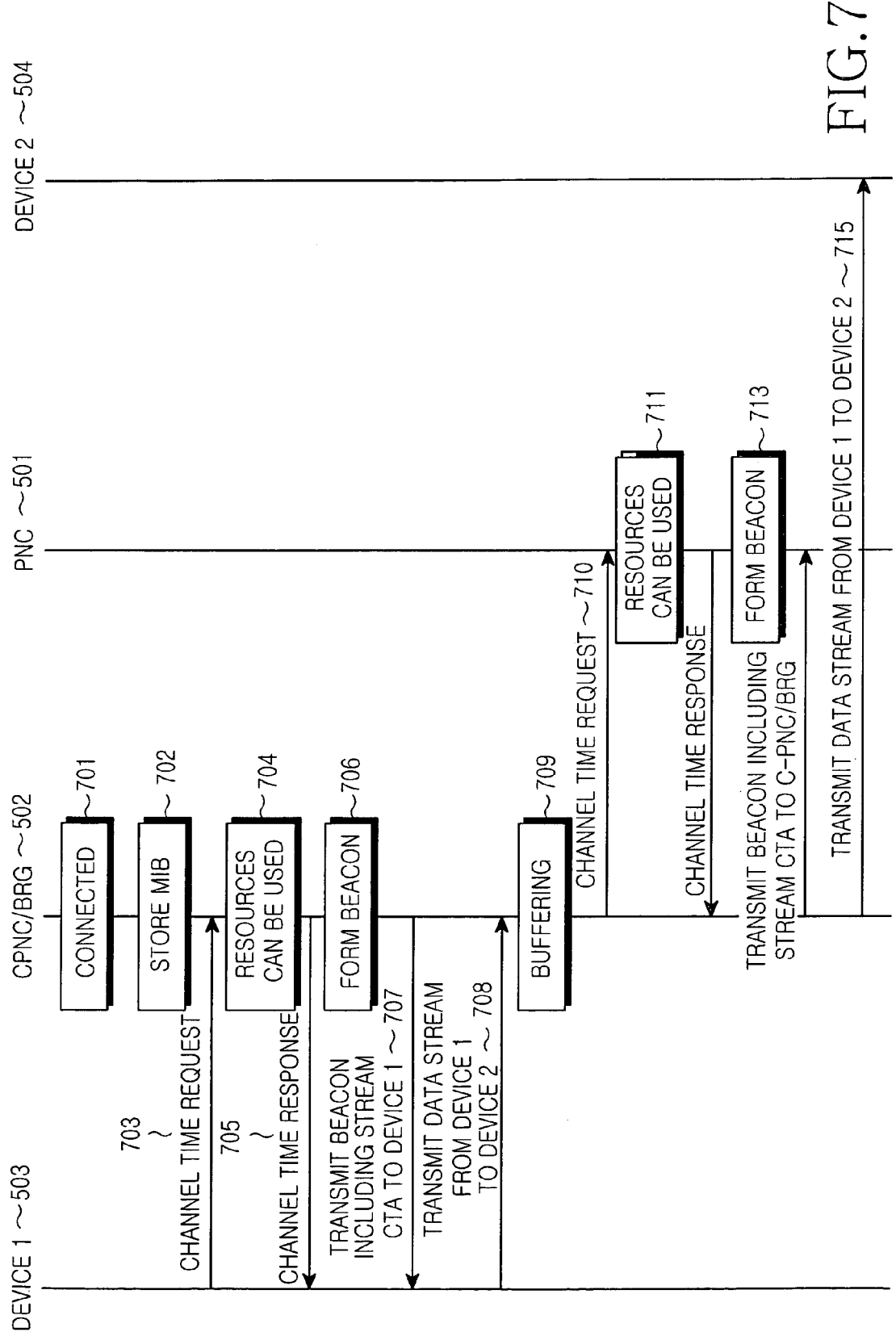
FIG. 7 is a flowchart illustrating data communications among devices that belong to different piconets according to an embodiment of the present invention.

FIG. 7 is a flowchart illustrating data communications among devices that belong to different piconets according to an embodiment of the present invention. In FIG. 7, an example of a data transmission from the device 1 503 that belongs to the child piconet to the device 2 504 that belongs to the parent piconet is shown.

In this illustrative example, the parent piconet and the child piconet are connected together (step 701), and MIBs of the respective devices are stored through the bridging operation (step 702).

Device 1 503 requests a channel time to the C-PNC/BRG device 502 for the data transmission (step 703). At this time, if the C-PNC/BRG device 502 can use resources for a TDM type data allocation (step 704), it transfers a channel time response to the device 1 503 (step 705).

The C-PNC/BRG device 502 forms a beacon in which control information is described (step 706), and transmits the beacon which includes a stream CTA for the requested data transmission to the device 1 503 (step 707). The device 1 503, which has received the stream CTA, transmits the data stream to the C-PNC/BRG device 502 at the corresponding channel time (step 708).

The C-PNC/BRG device 502 performs a buffering of the transmitted data stream (step 709), requests a channel time to the PNC device 501 for the data transmission (step 710). When the PNC 501 can use resources for a TDM type data allocation (step 711), it transfers a channel time response to the PNC/BRG device 502 (step 712).

The PNC device 501 forms a beacon in which control information is described (step 713), and transmits the beacon which includes a stream CTA for the requested data transmission to the C-PNC/BRG device 502 (step 714). The C-PNC/BRG device 502, which has received the stream CTA, transmits the data stream to the device 2 504 at the corresponding channel time (step 715). Since the C-PNC/BRG device 502 and the device 2 504 perform the data transmission in the same piconet, the data transmission is performed without passing through the PNC device 501.

For the above-described operation, it should be possible to confirm the positions of the piconets for the respective devices. This becomes possible by providing the destination piconet ID and the source piconet ID through the data structure according to the present invention as shown in FIG. 4. Also, for the data transmission between the piconets, it is required for the bridge as shown in FIG. 6 to perform the bridging operation according to the destination piconet ID and the source piconet ID.

FIG. 8 is a flowchart illustrating data communications among devices that belong to different piconets according to another embodiment of the present invention. In FIG. 8, an example of a data transmission from the device 2 504 that belongs to the parent piconet to the device 1 503 that belongs to the child piconet is shown.

In this illustrative case, the parent piconet and the child piconet are connected together (step 801), and MIBs of the respective devices are stored through the bridging operation (step 802).

Then, the device 2 504 requests a channel time to the PNC device 501 for the data transmission (step 803). At this time, when the PNC device 501 can use resources for a TDM type data allocation (step 804), it transfers a channel time response to the device 2 504 (step 805).

The PNC device 501 forms a beacon in which control information is described (step 806), and transmits the beacon which includes a stream CTA for the requested data transmission to the device 2 504 (step 807). The device 2 504, which has received the stream CTA, transmits the data stream to the C-PNC/BRG device 502 at the corresponding channel time (step 808). Since the C-PNC/BRG device 502 and the device 2 504 perform the data transmission in the same piconet, the data transmission is performed without passing through the PNC device 501.

The C-PNC/BRG device 502 performs a buffering of the transmitted data stream (step 809), forms a beacon in which control information that includes the CTA is described (step 810), and transmits the data stream to the device 1 503 (step 811). Through the above-described method, it is possible to perform communications between the different piconets.

For the above-described operation, it should be possible to confirm the positions of the piconets for the respective devices. This becomes possible by providing the destination piconet ID and the source piconet ID through the data structure according to the present invention as shown in FIG. 4. Also, for the data transmission between the piconets, it is required for the bridge as shown in FIG. 6 to perform the bridging operation according to the destination piconet ID and the source piconet ID.

The method according to the present invention as described above may be implemented by a program, and stored in a recording medium (e.g., CD ROM, floppy disc, hard disc, optomagnetic disc, etc.) in a form readable through a computer.

As described above, the frame structure in a high-speed WPAN using a UWB and the message transmitting method thereof according to the present invention enables communications among devices existing in different piconets by using a device that provides a bridging function in the IEEE 802.15.3 WPAN.

Also, the present invention broadcasts information of all the devices using a bridging device, and can avoid overlapping of the device IDs.

Although one child piconet and one parent piconet have been described in the embodiment of the present invention, it will be apparent to those skilled in the art that the present invention can also be applied to communications among plural piconets which are constructed in a manner that a first child piconet, a second child piconet that has the first child piconet as its parent piconet, a third child piconet that has the second child piconet as its parent piconet, etc., are connected in series.

Also, the present invention can also be applied to communications among plural piconets which are constructed in a manner that plural devices in a parent piconet designate their child piconets, respectively.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A bridging device for a bridging operation in a high-speed wireless personal area network (WPAN) system that includes a parent piconet having a plurality of devices, a child piconet using time slots allocated by the devices located in the parent piconet, said bridge device located in the child piconet broadcasts information about the devices of the parent piconet and information about the devices of the child piconet, and operates to perform a data transfer between a first specified device included in one piconet and a second specified device included in a second piconet, wherein a specified device included in the high-speed WPAN constructs a MAC (Media Access Control) header data structure for a data transmission that includes a piconet identification field comprising a source piconet identification (ID) field for indicating the piconet to which the specified device belongs, and a destination piconet identification (ID) field for indicating the destination piconet to which the destination device, to which the specified device intends to transmit data, belongs and said bridge device compares a value of said source and destination piconet identification fields to determine whether said data transmission remains within or is provided outside of said source piconet; and performs an operation that includes:
receiving data from the first specified device;
terminating a bridging operation with respect to the data if the value of the source piconet ID field is equal to the value of the destination piconet ID field;
buffering the data if the value of the source piconet ID field is different from the value of the destination piconet ID field;
receiving a time allocation message from the destination piconet, and
transmitting the buffered data at a time allocated by the time allocation message.

2. The bridge device as claimed in claim 1, wherein the bridge device operates as a piconet coordinator of the child piconet.

3. The bridge device as claimed in claim 1, wherein both the source piconet ID field and the destination piconet ID field are each composed of one byte.

4. The bridge device as claimed in claim 1, wherein information about the devices included in the high-speed WPAN system is broadcast through the bridge device, so that overlapping of device IDs among the devices is prevented.

* * * * *